(12) United States Patent
Shirai et al.

(10) Patent No.: US 7,041,422 B2
(45) Date of Patent: May 9, 2006

(54) RESIN BINDER FOR TONER

(75) Inventors: Eiji Shirai, Wakayama (JP); Hiroyuki Kawaji, Wakayama (JP)

(73) Assignee: Kao Corporation, Tokyo (JP)

( * ) Notice: Subject to any disclaimer, the term of this patent is extended or adjusted under 35 U.S.C. 154(b) by 129 days.

(21) Appl. No.: 10/442,272

(22) Filed: May 21, 2003

(65) Prior Publication Data

US 2003/0224278 A1    Dec. 4, 2003

(30) Foreign Application Priority Data

May 21, 2002  (JP) .............................. 2002-145665

(51) Int. Cl.
    *G03G 9/087*    (2006.01)
(52) U.S. Cl. .............. 430/109.4; 430/109.3; 430/124
(58) Field of Classification Search ............. 430/109.4, 430/124, 109.3; 528/272
    See application file for complete search history.

(56) References Cited

U.S. PATENT DOCUMENTS

| | | | |
|---|---|---|---|
| 5,587,265 A | | 12/1996 | Nakadera et al. |
| 5,698,422 A | * | 12/1997 | Sacripante et al. ....... 430/109.4 |
| 5,738,965 A | * | 4/1998 | Nakadera et al. ......... 430/109.4 |
| 6,780,557 B1 | * | 8/2004 | Kawaji et al. ............ 430/109.3 |
| 6,830,860 B1 | * | 12/2004 | Sacripante et al. ....... 430/109.4 |
| 2001/0018157 A1 | * | 8/2001 | Aoki et al. ............... 430/109.4 |

FOREIGN PATENT DOCUMENTS

| | | |
|---|---|---|
| DE | 10245223 A1 * | 5/2003 |
| EP | 1126324 A1 | 8/2001 |
| GB | 2289950 A | 12/1995 |
| JP | 2-173038 A | 7/1990 |
| JP | 7-333891 A | 12/1995 |
| JP | 7-333892 A | 12/1995 |
| JP | 11-249339 A | 9/1999 |
| JP | 2001-222138 A | 8/2001 |
| JP | 2001-305796 A | 11/2001 |
| JP | 2002-49182 A | 2/2002 |
| WO | WO02/21219 A1 | 3/2002 |

OTHER PUBLICATIONS

Diamond, Arthur S. (ed.) Handbook of Imaging Materials. New York: Marcel-Dekkar, Inc. (1991) pp. 160-161.*

* cited by examiner

*Primary Examiner*—Christopher Rodee
(74) *Attorney, Agent, or Firm*—Birch, Stewart, Kolasch & Birch, LLP

(57) ABSTRACT

A resin binder for a toner comprising a crystalline polyester having a ratio of a softening point to a maximum peak temperature of heat of fusion (softening point/peak temperature) of from 0.6 to 1.3, wherein the crystalline polyester is prepared by polycondensing a monomer mixture comprising 0.1 to 10% by mol of at least one monovalent aliphatic compound selected from the group consisting of a monovalent aliphatic carboxylic acid compound having 10 to 24 carbon atoms and a monovalent aliphatic alcohol having 10 to 24 carbon atoms; a toner comprising a resin composition comprising the resin binder as defined in above; and a method for fixing a toner, wherein the toner as defined in above is applied to a heat-and-pressure fixing method. The toner comprising the above resin binder is used for developing electrostatic latent images formed in electrophotography, electrostatic recording method, electrostatic printing and the like.

16 Claims, No Drawings

RESIN BINDER FOR TONER

This nonprovisional application claims priority under 35 U.S.C. § 119(a) on Patent Application No(s). 2002-145665 filed in JAPAN on May 21, 2002, which is(are) herein incorporated by reference.

BACKGROUND OF THE INVENTION

1. Field of the Invention

The present invention relates to a resin binder for a toner used for developing electrostatic latent images formed in electrophotography, electrostatic recording method, electrostatic printing, and the like, and a toner comprising the resin binder.

2. Discussion of the Related Art

As a means for improving the low-temperature fixing ability, which is one of the major problems to be solved in electrophotography, a resin binder for a toner comprising a crystalline polyester has been proposed (Japanese Patent Laid-Open No. 2001-222138).

However, the low-temperature fixing ability and the pulverizability of a resin generally tend to be properties which conflict with each other. Therefore, in a crystalline polyester, there also arises a problem that the resin is fused to the blades or the wall of a rough pulverizer during rough pulverization. In addition, since a toner comprising a crystalline polyester is fixed at a temperature lower than that of a conventional toner, the toner viscosity during fixing becomes high, so that sheet adhesion around a fixing device such as a fixing roller is likely to be caused. In order to solve this problem, there has been proposed to add a wax to a toner. However, mere addition of a wax cannot excellently improve various properties in a good balance.

An object of the present invention is to provide a resin binder for a toner which is highly excellent in the low-temperature fixing ability, and excellent in prevention of sheet adhesion and storage property, without causing the lowering of pulverizability due to the fusion to a rough pulverizer and the like during rough pulverization; and a toner comprising the resin binder.

These and other objects of the present invention will be apparent from the following description.

SUMMARY OF THE INVENTION

The present invention relates to a resin binder for a toner comprising a crystalline polyester prepared by polycondensing a monomer mixture comprising 0.1 to 10% by mol of at least one monovalent aliphatic compound selected from the group consisting of a monovalent aliphatic carboxylic acid compound having 10 to 24 carbon atoms and a monovalent aliphatic alcohol having 10 to 24 carbon atoms; and a toner comprising a resin composition comprising the resin binder.

DETAILED DESCRIPTION OF THE INVENTION

The crystalline polyester contained in the resin binder for a toner of the present invention is prepared by polymerizing a monomer mixture comprising a monovalent aliphatic compound having 10 to 24 carbon atoms, preferably 12 to 18 carbon atoms. In the present invention, since the above-mentioned aliphatic compounds are used, the pulverizability of the crystalline polyester is improved, and the sheet adhesion around a fixing roller and the like during the low-temperature fixing is prevented. When crystalline polyesters are prepared using the monovalent aliphatic compounds, the aliphatic groups contained in these compounds are incorporated into the resins as terminal groups, so that influences on the crystal structure are very small, so that effects of improvement in the pulverizability and prevention of sheet adhesion are obtained, with a minimal influence on the fixing ability. For these reasons, the low-temperature fixing ability inherently owned by the crystalline polyester becomes still more excellent.

In the present invention, the monovalent aliphatic compound is at least one compound selected from the group consisting of a monovalent aliphatic carboxylic acid compound having 10 to 24 carbon atoms and a monovalent aliphatic alcohol having 10 to 24 carbon atoms.

The monovalent aliphatic carboxylic acid compound having 10 to 24 carbon atoms includes decanoic acid, undcanoic acid, lauric acid, palmitic acid, stearic acid, oleic acid, behenic acid, anhydrides thereof, alkyl(1 to 3 carbon atoms) esters thereof, and the like.

The monovalent aliphatic alcohol having 10 to 24 carbon atoms includes 1-dodecanol, pentadecanol, hexadecanol, octadecanol (stearyl alcohol), and the like.

The monovalent aliphatic compound may have any of a linear structure and a branched structure. In order to enhance the desired effects of the present invention, it is preferable that the monovalent aliphatic compound has a linear structure with 10 to 24 carbon atoms, preferably 12 to 18 carbon atoms.

The monovalent aliphatic compound is contained in the monomer mixture in an amount of from 0.1 to 10% by mol, preferably from 1 to 8% by mol, more preferably from 2 to 6% by mol.

Incidentally, Japanese Patent Laid-Open Nos. Hei 7-333891 and Hei 7-333892 disclose that long-chain aliphatic monomers are reacted in order to hold the non-offset temperature region of an amorphous polyester. However, it is not suggested therein that the long-chain aliphatic monomers are effective for the pulverlizability and prevention of the sheet adhesion, which are the problems peculiar to the toner comprising the crystalline polyester of the present invention.

In the present invention, the crystalline polyester is obtained by polycondensing an alcohol component and a carboxylic acid component, in which the crystallinity of the resulting polyester is increased by appropriately selecting the kinds of the monomers, the reaction conditions and the like. The indexes for obtaining a polyester having a higher crystallinity are shown below.

It is preferable that an alcohol component comprising an aliphatic diol having 2 to 6 carbon atoms, preferably 4 to 6 carbon atoms, and a carboxylic acid component comprising an aliphatic dicarboxylic acid compound having 2 to 8 carbon atoms, preferably 4 to 6 carbon atoms, more preferably 4 carbon atoms, are contained in the monomer mixture as the monomers for accelerating the crystallization of a polyester. Specifically, it is preferable that the monomer mixture for the crystalline polyester in the present invention comprises an alcohol component comprising an aliphatic diol having 2 to 6 carbon atoms, and a carboxylic acid component comprising an aliphatic dicarboxylic acid compound having 2 to 8 carbon atoms, and that an aliphatic compound having 10 to 24 carbon atoms is contained in at least one of the two components in an amount of from 0.1 to 10% by mol of the entire monomer mixture.

The aliphatic diol having 2 to 6 carbon atoms includes ethylene glycol, 1,2-propylene glycol, 1,3-propylene glycol, 1,4-butanediol, 1,5-pentanediol, 1,6-hexanediol, neopentyl glycol, 1,4-butenediol, and the like. Among them, an α,ω-linear alkanediol is preferable, and 1,4-butanediol and 1,6-hexanediol are more preferable.

It is desirable that the aliphatic diol having 2 to 6 carbon atoms is contained in the alcohol component in an amount of 60% by mol or more, preferably from 80 to 100% by mol, more preferably from 90 to 100% by mol. Here, the above-mentioned "100% by mol" refers to the case where only the aliphatic carboxylic acid compound is contained as the above-mentioned aliphatic compound. Especially, it is desirable that one aliphatic diol constitutes 70% by mol or more, preferably 80% by mol or more, more preferably from 85 to 95% by mol, of the alcohol component. Above all, it is desirable that 1,4-butanediol is contained in the alcohol component in an amount of preferably 60% by mol or more, more preferably from 70 to 100% by mol, especially preferably from 80 to 100% by mol.

The alcohol component may contain a polyhydric alcohol component other than the aliphatic diol having 2 to 6 carbon atoms. The polyhydric alcohol component includes a divalent aromatic alcohol such as an alkylene(2 to 3 carbon atoms) oxide adduct (average number of moles added being 1 to 10) of bisphenol A, such as polyoxypropylene(2.2)-2,2-bis(4-hydroxyphenyl)propane and polyoxyethylene(2.2)-2,2-bis(4-hydroxyphenyl)propane; a trihydric or higher polyhydric alcohol such as glycerol, pentaerythritol and trimethylolpropane.

The aliphatic dicarboxylic acid compound having 2 to 8 carbon atoms includes adipic acid, oxalic acid, malonic acid, maleic acid, fumaric acid, citraconic acid, itaconic acid, glutaconic acid, succinic acid, anhydrides thereof, alkyl(1 to 3 carbon atoms) esters thereof, and the like, among which fumaric acid is preferable. Incidentally, as described above, the aliphatic dicarboxylic acid compound refers to an aliphatic dicarboxylic acid, an anhydride thereof and an alkyl(1 to 3 carbon atoms) ester thereof, among which the aliphatic dicarboxylic acid is preferable.

It is desirable that the aliphatic dicarboxylic acid compound having 2 to 8 carbon atoms is contained in the carboxylic acid component in an amount of 60% by mol or more, preferably from 80 to 100% by mol, more preferably from 90 to 100% by mol. Here, the above-mentioned "100% by mol" refers to the case where only the aliphatic alcohol is contained as the above-mentioned aliphatic compound. Especially, it is desirable that one aliphatic dicarboxylic acid compound constitutes 60% by mol or more, preferably 80% by mol or more, preferably from 85 to 100% by mol, of the carboxylic acid component. Above all, it is desirable that fumaric acid is contained in the carboxylic acid component in an amount of preferably 60% by mol or more, more preferably from 70 to 100% by mol, especially preferably from 80 to 100% by mol.

The carboxylic acid component may contain a polycarboxylic acid component other than the aliphatic dicarboxylic acid compound having 2 to 8 carbon atoms. The polycarboxylic acid component includes aromatic dicarboxylic acids such as phthalic acid, isophthalic acid and terephthalic acid; aliphatic dicarboxylic acids such as sebacic acid, azelaic acid, n-dodecylsuccinic acid and n-dodecenylsuccinic acid; alicyclic dicarboxylic acids such as cyclohexanedicarboxylic acid; tricarboxylic or higher polycarboxylic acids such as trimellitic acid and pyromellitic acid; anhydrides thereof, alkyl(1 to 3 carbon atoms) esters thereof, and the like.

The polycondensation of a monomer mixture comprising the alcohol component and the carboxylic acid component can be carried out, for instance, by the reaction at a temperature of from 120° to 230° C. in an inert gas atmosphere, using an esterification catalyst, a polymerization inhibitor or the like as occasion demands. Concretely, in order to enhance the strength of the resin, an entire monomer may be charged at once. Alternatively, in order to reduce the low-molecular weight components, divalent monomers may be firstly reacted, and thereafter trivalent or higher polyvalent monomers are added and reacted. In addition, it is also effective as a means for increasing the crystallinity by reducing the pressure, for instance, to 10 kPa or lower, of the reaction system in the second half of the polymerization, thereby accelerating the reaction.

Here, in the present invention, the term "crystalline" means that a ratio of the softening point to the maximum peak temperature of heat of fusion (softening point/peak temperature) is from 0.6 to 1.3. Further, a resin having a higher crystallinity, specifically a resin having a ratio of the softening point to the maximum peak temperature of heat of fusion of preferably from 0.8 to 1.1, more preferably from 0.9 to 1.0, is preferable because the effects of the present invention are still more effectively exhibited. Also, the term "amorphous" means that a ratio of the softening point to the maximum peak temperature of heat of fusion (softening point/peak temperature) is exceeding 1.3. In the present invention, it is especially preferable that an amorphous resin has a ratio of the softening point to the maximum peak temperature of heat of fusion of from 1.5 to 5.0, more preferably from 1.5 to 3.0.

The crystalline polyester in the present invention has a softening point of preferably from 85° to 150° C., more preferably from 90° to 140° C., especially preferably from 100° to 120° C.

Incidentally, in the case where the crystalline polyester comprises two or more resins, it is desirable that at least one of them, preferably all of them, is the crystalline polyester described above.

It is preferable that the resin binder for a toner comprising the crystalline polyester of the present invention is contained in a toner together with another known resin binder, preferably an amorphous resin.

Therefore, in the present invention, there is further provided a toner comprising as a resin binder a resin composition comprising a resin binder comprising the above-mentioned crystalline polyester excellent in the low-temperature fixing ability. The toner of the present invention exhibits a highly excellent low-temperature fixing ability because the toner comprises as a resin binder a crystalline polyester which is also excellent in prevention of the sheet adhesion.

The content of the crystalline polyester in the resin composition is preferably from 1 to 50% by weight, more preferably from 5 to 40% by weight, especially preferably from 20 to 40% by weight, from the viewpoints of the low-temperature fixing ability and the durability.

The amorphous resin includes amorphous polyesters, amorphous polyester-polyamides, vinyl resins such as amorphous styrene-acrylic resins, hybrid resins comprising two or more resin components which are partially chemically bonded to each other, mixtures thereof, and the like. Among them, from the viewpoints of the fixing ability and the compatibility with the crystalline polyester, the amorphous polyesters and hybrid resins comprising an amorphous polyester component and a vinyl resin component are preferable, and the amorphous polyesters are more preferable.

The amorphous polyester can be prepared in the same manner as in the crystalline polyester. Here, in order to prepare an amorphous polyester, it is preferable that the following requirements are met:

1) in a case where monomers for accelerating crystallization of a resin, such as an aliphatic diol having 2 to 6 carbon atoms and an aliphatic dicarboxylic compound having 2 to 8 carbon atoms, are used, a resin in which crystallization is suppressed by using two or more of these monomers in combination, in each of the alcohol component and the carboxylic acid component, one of these monomers is used in an amount of from 10 to 70% by mol, preferably 20 to 60% by mol of each component, and these monomers are used in two or more kinds, preferably two to four kinds; or 2) a resin obtained from monomers for accelerating amorphousness of a resin, preferably an alkylene oxide adduct of bisphenol A as an alcohol component, or an aromatic carboxylic acid or a substituted succinic acid of which substituent is an alkyl group or alkenyl group as a carboxylic acid component are used in an amount of from 30 to 100% by mol, preferably from 50 to 100% by mol, of the alcohol component or the carboxylic acid component, preferably of the alcohol component and the carboxylic acid component, respectively.

Also, as the raw material monomers for the amorphous polyester-polyamides, in addition to the polyhydric alcohol component and the polycarboxylic acid component described above, in order to form the amide components, polyamines such as ethylenediamine, pentamethylenediamine, hexamethylenediamine, diethylenetriamine, iminobispropylamine, phenylenediamine, xylylenediamine and triethylenetetramine; aminocarboxylic acids such as 6-aminocaproic acid and ε-caprolactam; amino alcohols such as propanolamine; and the like are used as the raw material monomers. Among them, hexamethylenediamine and ε-caprolactam are preferable.

The amorphous polyesters and the amorphous polyester-polyamides can be prepared in the same manner as in the crystalline polyester.

In the present invention, the hybrid resin may be obtained by using two or more resins as raw materials, or it may be obtained by using one resin and raw material monomers of the other resin. Further, the hybrid resin may be obtained from a mixture of raw material monomers of two or more resins. In order to efficiently obtain a hybrid resin, those obtained from a mixture of raw material monomers of two or more resins are preferable.

Therefore, it is preferable that the hybrid resin is obtained by mixing raw material monomers for two polymerization resins each having independent reaction paths, preferably raw material monomers for the condensation polymerization resin and raw material monomers for the addition polymerization resin, and carrying out the two polymerization reactions. Specifically, the hybrid resin disclosed in Japanese Patent Laid-Open No. Hei 10-087839 is preferable.

Representative examples of the condensation polymerization resin include polyesters, polyester-polyamides, polyamides, and the like, among which polyesters are preferable. Representative examples of the above-mentioned addition polymerization resin include vinyl resins obtained by radical polymerization, and other resins.

The amorphous resin has a softening point of preferably from 70° to 180° C., more preferably from 100° to 160° C., and a glass transition point of preferably from 45° to 80° C., more preferably from 55° to 75° C. Incidentally, glass transition point is a property intrinsically owned by an amorphous resin, and is distinguished from the maximum peak temperature of heat of fusion.

Incidentally, in the case where the amorphous resin comprises two or more resins, it is desirable that at least one of them, preferably all of them, is the amorphous resin having the properties described above. Especially, from the viewpoints of the low-temperature fixing ability and the high-temperature offset resistance, it is preferable that a low-softening point resin having a softening point of 70° C. or more and less than 120° C. and a high-softening point resin having a softening point of 120° C. or more and 160° C. or less are used together in a weight ratio (low-softening point resin/high-softening point resin) of preferably from 20/80 to 80/20.

It is preferable that the weight ratio of the crystalline polyester to the amorphous resin (crystalline polyester/amorphous resin) is preferably from 1/99 to 50/50, more preferably from 5/95 to 40/60, especially preferably from 20/80 to 40/60, from the viewpoints of the triboelectric chargeability, the storage property, the low-temperature fixing ability and the durability.

The toner of the present invention may appropriately contain an additive such as a colorant, a charge control agent, a releasing agent, an electric conductivity modifier, an extender, a reinforcing filler such as a fibrous substance, an antioxidant, an anti-aging agent, a fluidity improver, and a cleanability improver.

As the colorant, all of the dyes and pigments which are used as colorants for a toner can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants can be used alone or in admixture of two or more kinds. The toner of the present invention can be used as any of black toners, color toners, and full color toners. The content of the colorant is preferably from 1 to 40 parts by weight, more preferably from 3 to 10 parts by weight, based on 100 parts by weight of the resin binder.

The charge control agent includes positively chargeable charge control agents such as Nigrosine dyes, triphenylmethane-based dyes containing a tertiary amine as a side chain, quaternary ammonium salt compounds, polyamine resins and imidazole derivatives, and negatively chargeable charge control agents such as metal-containing azo dyes, copper phthalocyanine dyes, metal complexes of alkyl derivatives of salicylic acid and boron complexes of benzilic acid.

The releasing agent includes waxes such as natural ester waxes such as carnauba wax and rice wax; synthetic waxes such as polypropylene wax, polyethylene wax and Fischer-Tropsch wax; coal waxes such as montan wax; and alcohol waxes. These waxes may be contained alone or in admixture of two or more kinds. Generally, in order to obtain excellent low-temperature fixing ability, it is preferable that a wax having a relatively low melting point, such as carnauba wax, is used together. In the toner of the present invention, excellent low-temperature fixing ability can be exhibited even when such a wax having a low melting point is used in a small amount.

The toner of the present invention may be prepared by any of conventionally known methods such as a kneading-pulverization method, an emulsion phase-inversion method and a polymerization method, and a pulverized toner obtained by the kneading-pulverizing method is preferable from the viewpoints of easily preparing the toner and markedly exhibiting the effects of the present invention. Incidentally, in the case where a toner is obtained by the kneading-pulverizing method, the toner can be prepared by homogeneously mixing a resin binder, a colorant and the like in a mixer such as a Henschel mixer, thereafter melt-kneading with a closed kneader, a single-screw or twin-screw extruder, or the like, cooling, pulverizing, and classifying. In the emulsion phase-inversion method, the toner can be prepared by dissolving or dispersing a resin binder, a colorant and the like in an organic solvent, thereafter emulsifying the mixture by adding water, separating the particles, and classifying. Further, a fluidity improver such as hydrophobic silica or the like may be externally added to the surface of the toner as occasion demands. The toner has a volume-average particle size of preferably from 3 to 15 μm.

The toner of the present invention, which is excellent in prevention of the sheet adhesion, is excellently fixed at a low temperature, without causing the sheet adhesion around a fixing device such as a fixing roller in the case of fixing a toner on a sheet by a heat-and-pressure fixing method. Therefore, the toner of the present invention can be suitably used as a toner for heat-and-pressure fixing.

In the present invention, there is provided a method for fixing a toner, wherein the toner of the present invention is applied to a heat-and-pressure fixing method.

EXAMPLES

[Softening Point]

Softening point refers to a temperature corresponding to ½ of the height (h) of the S-shaped curve showing the relationship between the downward movement of a plunger (flow length) and temperature, namely, a temperature at which a half of the resin flows out, when measured by using a flow tester of the "koka" type ("CFT-500D," commercially available from Shimadzu Corporation) in which a 1 g sample is extruded through a nozzle having a dice pore size of 1 mm and a length of 1 mm, while heating the sample so as to raise the temperature at a rate of 6° C./min and applying a load of 1.96 MPa thereto with the plunger.

[Maximum Peak Temperature of Heat of Fusion and Glass Transition Point]

The maximum peak temperature of heat of fusion is determined using a differential scanning calorimeter ("DSC 210," commercially available from Seiko Instruments, Inc.), by raising its temperature to 200° C., cooling the hot sample to 0° C. at a cooling rate of 10° C./min., and thereafter heating the sample so as to raise the temperature at a rate of 10° C./min. Incidentally, the maximum peak temperature of heat of fusion corresponds to the melting point in the case of a releasing agent. In addition, the glass transition point characteristically owned by an amorphous resin refers to the temperature of an intersection of the extension of the baseline of equal to or lower than the maximum peak temperature and the tangential line showing the maximum inclination between the kickoff of the peak and the top of the peak by the determination mentioned above.

Preparation Examples of Crystalline Polyesters (Resins a to k)

A 5-liter four-necked flask equipped with a nitrogen inlet tube, a dehydration tube, a stirrer and a thermocouple was charged with the raw material monomers as shown in Tables 1 and 2, and 2 g of hydroquinone, and the ingredients were reacted at 160° C. over a period of 5 hours. Thereafter, the temperature was raised to 200° C., and the ingredients were reacted for 1 hour and further reacted at 8.3 kPa for 1 hour, to give a crystalline polyester (each of Resins a to k).

Here, a part of the resulting crystalline polyester was roughly pulverized, and sieved using two sieves, in which one having a sieve opening of 1 mm was placed on top of the other sieve having a sieve opening of 750 μm. Twenty grams of the rough pulverization product accumulated on the sieve having a sieve opening of 750 μm, specifically the rough pulverization product having a uniform particle size of 750 μm or more and 1 mm or less, was stirred for 2 minutes using a coffee mill (Panasonic MX-X62). After the resin was removed using a vacuum cleaner, the presence or absence of fusion of the resin inside the mill was confirmed, and the pulverizability of the resin was evaluated according to the following evaluation criteria. The results are shown in Tables 1 and 2.

[Evaluation Criteria]

⊚: No fusion being observed at all;

○: Slight fusion to the blades being observed;

Δ: Obvious fusion to the blades being observed; and x: A large amount of fusion to the blades and the wall being observed.

TABLE 1

|  | Reins a | Reins b | Reins c | Reins d | Reins e | Reins f |
| --- | --- | --- | --- | --- | --- | --- |
| 1,4-Butanediol | 1053 g (90) | 1053 g (90) | 1053 g (90) | 1053 g (90) | 1053 g (90) | 1053 g (90) |
| 1,6-Hexanediol | 153 g (10) | 153 g (10) | 153 g (10) | 153 g (10) | 153 g (10) | 153 g (10) |
| Stearyl Alcohol | — | — | — | — | — | 352 g (10) |
| Fumaric Acid | 1508 g (100) | 1493 g (99) | 1433 g (95) | 1387 g (92) | 1282 g (85) | 1433 g (95) |
| Stearic Acid | — | 74 g (2) | 370 g (10) | 592 g (16) | 1110 g (30) | — |
| Softening Point (° C.) | 123.7 | 122.6 | 110.1 | 100.1 | 60.9 | 110.7 |
| Maximum Peak Temperature (° C.) of Heat of Fusion | 125.3 | 123.5 | 115.3 | 108.7 | 91.6 | 116.6 |
| Pulverizability | X | ○ | ⊚ | ○ | Δ | ⊚ |

Note)

The values in parentheses are expressed by molar ratios.

TABLE 2

|  | Reins g | Reins h | Reins i | Reins j | Reins k |
|---|---|---|---|---|---|
| 1,4-Butanediol | 1053 g (90) | 1053 g (90) | 1053 g (90) | 1053 g (90) | 1053 g (90) |
| 1,6-Hexanediol | 153 g (10) | 153 g (10) | 153 g (10) | 153 g (10) | 153 g (10) |
| Stearyl Alcohol | — | — | 176 g (5) | — | — |
| Fumaric Acid | 1433 g (95) | 1433 g (95) | 1433 g (95) | 1508 g (100) | 1433 g (95) |
| Stearic Acid | — | — | 185 g (5) | 370 g (10) | — |
| Lauric Acid | 260 g (10) | — | — | — | — |
| Behenic Acid | — | 443 g (10) | — | — | — |
| Hexanoic Acid | — | — | — | — | 81 g (10) |
| Softening Point (° C.) | 111.1 | 108.3 | 109.8 | 110.0 | 113.5 |
| Maximum Peak Temperature (° C.) of Heat of Fusion | 117.1 | 114.4 | 115.9 | 116.1 | 119.0 |
| Pulverizability | ◯ | ◯ | ◎ | ◎ | X |

Note)
The values in parentheses are expressed by molar ratios.

Preparation Examples of Amorphous Polyesters (Resins A and B)

A 5-liter four-necked flask equipped with a nitrogen inlet tube, a dehydration tube, a stirrer and a thermocouple was charged with the raw material monomers except trimellitic anhydride as shown in Table 3, and 4 g of dibutyltin oxide, and the ingredients were reacted at 220° C. over a period of 8 hours, and then reacted at 8.3 kPa for 1 hour. Further, trimellitic anhydride was added to the reaction mixture at 210° C., and reacted until the desired softening point was attained, to give an amorphous polyester (each of Resins A and B).

TABLE 3

|  | Resin A | Resin B |
|---|---|---|
| BPA-PO[1)] | 1715 g (49.2) | 2083 g (61.1) |
| BPA-EO[2)] | 683 g (19.6) | 341 g (10.0) |
| Fumaric Acid | — | 406 g (11.9) |
| Terephthalic Acid | 674 g (19.3) | 581 g (17.0) |
| Dodecenylsuccinic Anhydride | 225 g (6.5) | — |
| Trimellitic Anhydride | 188 g (5.4) | — |
| Softening Point (° C.) | 145.2 | 104.3 |
| Maximum Peak Temperature (° C.) of Heat of Fusion | 68.7 | 65.0 |
| Glass Transition Point (° C.) | 64.1 | 60.6 |

Note)
The values in parentheses are expressed by weight ratios.
[1)]Propylene oxide adduct of bisphenol A (2.2 mol)
[2)]Ethylene oxide adduct of bisphenol A (2.2 mol)

Examples 1, 3 to 10 and Comparative Examples 1 to 5

One-hundred parts by weight of a resin binder as shown in Table 4, 1 part by weight of a charge control agent "T-77" (commercially available from Hodogaya Chemical Co., Ltd.), 4 parts by weight of a carbon black "MOGUL L" (commercially available from Cabot Corporation) and a releasing agent as shown in Table 4 were mixed together with a Henschel mixer. The mixture was melt-kneaded using a co-rotating twin-screw extruder (entire length of the kneading portion: 1560 mm; screw diameter: 42 mm; barrel inner diameter: 43 mm). Incidentally, the rotational speed of the roller was 200 r/min., the heating temperature within the roller was 100° C., the feeding rate of the mixture was 10 kg/h, and the average residence time of the mixture was about 18 seconds. The resulting melt-kneaded product was cooled and roughly pulverized. Subsequently, the resulting product was pulverized with a jet mill and classified, to give a powder having a volume-average particle size of 8.0 μm.

One part by weight of a hydrophobic silica "R-972" (commercially available from Nippon Aerosil) was added to 100 parts by weight of the resulting powder, and mixed with a Henschel mixer, to give a toner.

Example 2

The same procedures were carried out as in Example 1 except that 1 part by weight of "LR-147" (commercially available from Japan Carlit) was used in place of "T-77," and 4 parts by weight of a cyan pigment "ECB-301" (commercially available from DAINICHISEIKA COLOR & CHEMICALS MFG. CO., LTD.) were used in place of the carbon black, to give a toner.

Test Example 1

[Evaluation of Sheet Adhesion and Low-Temperature Fixing Ability]

A toner was loaded in a modified apparatus of a copy machine "AR-505" (commercially available from Sharp Corporation) in which a toner could be fixed by offline, and an unfixed image was obtained. The resulting unfixed images were fixed outside the copy machine by sequentially raising the temperature of the fixing roller from 90° to 240° C. in increments of 5° C. Incidentally, during this test, the sheet adhesion around the fixing roller was generated with some of the toners. The presence or absence of the sheet adhesion is shown in Table 4. Specifically, the presence or absence of the sheet adhesion was evaluated according to the following criteria:

[Evaluation Criteria]
◎: No sheet adhesion being observed at all;
◯: Hardly any sheet adhesion being observed; and
x: Obvious sheet adhesion being observed.

A sand-rubber eraser to which a load of 500 g was applied, the eraser having a bottom area of 15 mm×7.5 mm, was moved backward and forward five times over a fixed image obtained at each fixing temperature. The optical reflective density of the image before or after the eraser treatment was measured with a reflective densitometer "RD-915" (manufactured by Macbeth Process Measurements Co.). The temperature of the fixing roller at which the ratio of the optical density after the eraser treatment to the optical density before the eraser treatment initially exceeds 70% is defined as the lowest fixing temperature. The low-temperature fixing ability was evaluated according to the following evaluation criteria. The sheets used for the fixing test were "CopyBond SF-70NA" (75 g/m$^2$) commercially available from Sharp Corporation. The results are shown in Table 4.

[Evaluation Criteria]
  ⊚: A lowest fixing temperature being lower than 110° C.;
  ○: A lowest fixing temperature being 110° C. or higher and lower than 120° C.;
  Δ: A lowest fixing temperature being 120° C. or higher and lower than 130° C.;
  x: A lowest fixing temperature being 130° C. or higher and lower than 140° C.; and
  xx: A lowest fixing temperature being 140° C. or higher.

Test Example 2

[Evaluation of Storage Property]
  Four grams of a toner was allowed to stand under environmental conditions of a temperature of 40° C. and a relative humidity of 60% for 72 hours. The generation of aggregation of the toner was visually observed, and the storage property was evaluated according to the following criteria. The results are shown in Table 4.

[Evaluation Criteria]
  ⊚: No aggregation being observed at all;
  ○: Hardly any aggregation being observed; and
  x: Obvious aggregation being observed.

sion around the fixing roller and that these toners are also excellent in the storage property. In contrast, the Reins a and k, which were obtained without using a monovalent aliphatic compound having 10 to 24 carbon atoms, are considerably fused during the pulverization. Also, in the toners of Comparative Examples 1 and 5 comprising these resins, the low-temperature fixing ability is poor, and the sheet adhesion is generated. From the results of Comparative Examples 2 and 3, the sheet adhesion around the fixing roller can be prevented by using a wax having a low melting point, but the low-temperature fixing ability is still insufficient. In addition, in the toner of Comparative Example 4, which comprises the Resin e obtained by using a monovalent aliphatic compound having 10 to 24 carbon atom in an amount exceeding a given amount, the storage property is poor, though there is no problem with the fixing ability.

The resin binder comprising the crystalline polyester of the present invention can be excellently pulverized without causing the lowering of the pulverizability due to the fusion to a pulverizer and the like. Further, since the toner comprising the resin binder can be fixed at a low temperature without the sheet adhesion around the fixing roller, the low-temperature fixing ability, an inherent characteristic of the crystalline polyester itself is still more outstandingly exhibited.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 4

| | Resin Binder (Compositional Ratio) | Releasing Agent[1] | Low-Temperature Fixing Ability | Presence or Absence of Sheet Adhesion | Storage Property |
|---|---|---|---|---|---|
| Ex. 1 | c/A/B = 20/60/20 | PP Wax = 1 | ○ | ○ | ⊚ |
| Ex. 2 | c/A/B = 20/60/20 | PP Wax = 1 | ○ | ○ | ⊚ |
| Ex. 3 | c/A/B = 20/60/20 | PP Wax = 1 Carnauba Wax = 1 | ⊚ | ○ | ○ |
| Ex. 4 | b/A/B = 20/60/20 | PP Wax = 1 | Δ | ○ | ⊚ |
| Ex. 5 | d/A/B = 20/60/20 | PP Wax = 1 | ○ | ○ | ○ |
| Ex. 6 | f/A/B = 20/60/20 | PP Wax = 1 | ○ | ○ | ⊚ |
| Ex. 7 | g/A/B = 20/60/20 | PP Wax = 1 | Δ | ○ | ⊚ |
| Ex. 8 | h/A/B = 20/60/20 | PP Wax = 1 | ○ | ○ | ○ |
| Ex. 9 | i/A/B = 20/60/20 | PP Wax = 1 | ○ | ○ | ⊚ |
| Ex. 10 | j/A/B = 20/60/20 | PP Wax = 1 | ○ | ○ | ○ |
| Comp. Ex. 1 | a/A/B = 20/60/20 | PP Wax = 1 | XX | X | ⊚ |
| Comp. Ex. 2 | a/A/B = 20/60/20 | PP Wax = 1 Carnauba Wax = 1 | X | Δ | ⊚ |
| Comp. Ex. 3 | a/A/B = 20/60/20 | PP Wax = 1 Carnauba Wax = 5 | X | ○ | Δ |
| Comp. Ex. 4 | e/A/B = 20/60/20 | PP Wax = 1 | ○ | ○ | X |
| Comp. Ex. 5 | k/A/B = 20/60/20 | PP Wax = 1 | XX | X | ⊚ |

Note)
The compositional ratios of Resins and the amounts of the releasing agents used are expressed by weight ratio.
[1] PP Wax (Polypropylene Wax): "NP-055" (commercially available from MITSUI CHEMICALS, INC., melting point: 145° C.)
Carnauba Wax: "Carnauba Wax C1" (commercially available from K.K. Kato Yoko, melting point: 84° C.)

It is seen from the above results that the crystalline polyesters (Resins b to d, and f to j), which were obtained by using a given amount of a monovalent aliphatic compound having 10 to 24 carbon atoms, can be excellently pulverized without being fused to the pulverizer. Also, it is seen from the above results that all of the toners of Examples obtained by using these crystalline polyesters as a resin binder can be fixed at a low temperature without causing the sheet adhe-

What is claimed is:
1. A toner comprising:
  a resin composition comprising a resin binder comprising
    a crystalline polyester having a ratio of a softening point to a maximum peak temperature of heat of fusion (softening point/peak temperature) of from 0.6 to 1.3, wherein the crystalline polyester is prepared by polycondensing a monomer mixture comprising 0.1 to 10% by mol of at least one monovalent aliphatic compound selected from the group consisting of a monovalent aliphatic carboxylic acid compound having 10 to 24 carbon atoms and a monovalent aliphatic alcohol having 10 to 24 carbon atoms; and at least one amorphous resin selected from the group consisting of an amorphous polyester, an amorphous polyester-polyamide and a vinyl resin.

2. The toner according to claim 1, wherein the crystalline polyester is contained in the resin composition in an amount of from 1 to 50% by weight.

3. The toner according to claim 1, wherein the amorphous resin has a softening point of from 70° to 180° C.

4. The toner according to claim 1, wherein the weight ratio of the crystalline polyester to the amorphous resin (crystalline polyester/amorphous resin) is from 1/99 to 50/50.

5. The toner according to claim 1, wherein the toner is usable for a printer comprising a fixing device for fixing a toner on a sheet by a heat-and-pressure fixing method.

6. A method for fixing a toner, wherein the toner as defined in claim 1 is applied to a heat-and-pressure fixing method.

7. The toner according to claim 1, wherein the aliphatic compound has a linear structure with 10 to 24 carbon atoms.

8. The toner according to claim 1, wherein the monovalent aliphatic carboxylic acid compound having 10 to 24 carbon atoms is decanoic acid, undecanoic acid, lauric acid, palmitic acid, stearic acid, oleic acid, behenic acid, anhydrides thereof, or alkyl (1 to 3 carbon atoms) esters thereof, and wherein the monovalent aliphatic alcohol having 10 to 24 carbon atoms is 1-dodecanol, pentadecanol, hexadecanol or octadecanol.

9. The toner according to claim 1, wherein the monovalent aliphatic compound is contained in the monomer mixture in an amount of from 1 to 8% by mol.

10. The toner according to claim 1, wherein the monomer mixture further comprises an alcohol component comprising an aliphatic diol having 2 to 6 carbon atoms, and a carboxylic acid component comprising an aliphatic dicarboxylic acid compound having 2 to 8 carbon atoms.

11. The toner according to claim 10, wherein the aliphatic diol having 2 to 6 carbon atoms is an α,ω-linear alkanediol having 2 to 6 carbon atoms.

12. The toner according to claim 10, wherein the aliphatic diol having 2 to 6 carbon atoms is contained in the alcohol component in an amount of 60% by mol or more.

13. The toner according to claim 10, wherein the aliphatic dicarboxylic acid compound having 2 to 8 carbon atoms is at least one selected from the group consisting of adipic acid, oxalic acid, malonic acid, maleic acid, fumaric acid, citraconic acid, itaconic acid, glutaconic acid, succinic acid, anhydrides thereof and alkyl (1 to 3 carbon atoms) esters thereof.

14. The toner according to claim 10, wherein the aliphatic dicarboxylic acid compound having 2 to 8 carbon atoms is contained in the carboxylic acid component in an amount of 60% by mol or more.

15. The toner according to claim 1, wherein the crystalline polyester has a softening point of from 85° to 150° C.

16. The toner according to claim 1, wherein the monomer mixture comprises an alcohol component and a carboxylic acid component, wherein the carboxylic acid component comprises fumaric acid in an amount of 60% by mol or more.

* * * * *